Patented Nov. 15, 1932

1,887,618

UNITED STATES PATENT OFFICE

THOMAS P. BELL, OF YONKERS, NEW YORK, ASSIGNOR TO THERMOPHOR MFG. COMPANY, INC., A CORPORATION OF DELAWARE

THERMOPHORIC MIXTURE

No Drawing. Application filed October 20, 1931. Serial No. 570,045.

This invention relates to improvements in thermophoric mixture or heat storing compounds, such mixture possessing the ability to absorb heat while being converted from a crystalline to a liquid condition and giving up heat when returning from a liquid to a crystalline condition.

Mixtures of this character are employed in various warming devices such as heat applicators for the body, foot warmers, plates, coffee pots and the like, the mixture or compound being placed within the container and the container placed in boiling water for a few moments until the thermophoric mixture liquefies. The mixture will remain warm for several hours thereafter until it recrystallizes.

The utmost skill and the greatest care have always been necessary in making mixtures of crystalline salts, for in the compounding they tend to form a sticky, gummy mass, difficult to insert in the containers, and one object of this invention is to provide a mixture that can be readily filled into containers through a relatively small opening therein.

Another object of the invention is to provide a thermophoric mixture in which the heat of recrystallization can be varied at will by varying the percentage of certain of the ingredients.

Another object is to provide a thermophoric mixture containing an anhydrous salt to avoid supersaturation on long continued heating or overboiling.

While various mixtures containing sodium acetate and glycerine have been heretofore used as heat storing compounds, their use has not been satisfactory for the reasons above noted, nor do they overcome overboiling by including in the mixture an anhydrous salt to avoid supersaturation. The prior art does not disclose any definite method of compounding a mixture including the anhydrous salt nor does it give any mixture containing a definite proportion of such salt.

The following specification discloses a special process of compounding the aforesaid chemicals and in definite proportions.

In order to accomplish the object set forth, herewith follows a description of compounding this improved thermophoric mixture.

Assuming that the vessel to be filled is to perform the functions of a heat retaining coffee pot, food dish or the like, the following formula would be used, the percentages referring to the weights of the respective substances:

| | Per cent |
|---|---|
| Sodium acetate | 92 |
| Glycerine | 3 |
| Crystalline sodium sulphate $Na_2SO_4(10H_2O)$ | 3 |
| Anhydrous sodium sulphate $Na_2SO_4$ | 2 |

A suitable vessel is selected and into this is poured sufficient glycerine (preferably C. P.) to coat the bottom and side walls of the vessel in order to prevent the sodium acetate from scorching and in order to facilitate melting the same.

The sodium acetate is placed in the vessel little by little as it melts until perhaps four-fifths of the total amount has been melted. With the remaining one-fifth of the sodium acetate is intimately mixed the crystalline and anhydrous sodium sulphate and this mixture is placed in the vessel and is allowed to melt and is brought to a temperature of about 160° F. The vessel used is preferably water jacketed and is kept covered, the mixture therein being thoroughly stirred while melting.

When the mixture has entirely melted the heating is discontinued and the mixture may be easily poured into the container.

By varying the percentage of sodium acetate the temperature range of the mixture can be readily changed within wide limits.

Heat applicators comprising flexible rubber applicators filled with a thermophoric mixture have heretofore been attempted. These must employ some kind of a metal stopper or filler cap which often leaks and thereby permits air and/or moisture to gain ingress to the thermophoric compound. The reason for the use of this filler cap has been that no known thermophoric mixture had the necessary characteristics that would enable it to be hermetically sealed within the container.

For example, mixtures of sodium acetate, sodium hyposulphite, glycerine and calcium chloride which have been used must be exposed to the atmosphere or be subjected to friction or other external exciting means in order to cause them to go into crystallization and give off heat. In some examples of the prior art various frictional means were placed within the container which could be rubbed together in order to start crystallization. Obviously, such starting means as well as the stoppers or filler caps are objectionable and are rendered entirely unnecessary by the present invention, as the mixture stated herein will recrystallize without exciting means.

Obviously, however, to be commercially successful the thermophoric mixture must have another characteristic if it is to be hermetically sealed within the container and that is that it must stand repeated overboiling.

Assuming, for example, that a container filled with a thermophoric mixture is allowed to boil 30 minutes instead of the usual 10 minutes, this overboiling will entirely dissolve the crystalline components and they will remain in the dissolved condition and will not recrystallize unless air is admitted or a crystal of one of the constituents is introduced. Obviously, if the mixture remains liquid the heat of recrystallization is lost and instead of the container remaining warm for several hours which is the case when the mixture operates perfectly, it will only act like an ordinary hot water container.

However, by the use of the anhydrous salt as heretofore mentioned it has been found that difficulty due to overboiling is eliminated and the hermetically sealed container can be repeatedly overboiled without causing the mixture to fail.

While anhydrous sodium sulphate is given in the foregoing example as the anhydrous salt, it is obvious that other anhydrous salts may be used. For example, a mixture can be used in which all of the sodium sulphate is in the crystalline form and an appropriate percentage of anhydrous sodium acetate is introduced to avoid supersaturation. The particular anhydrous salt will depend upon the particular crystalline constituents used and this may be varied within wide limits. Assuming that the container has been filled with the thermophoric mixture compounded as herein described and that for some reason this container has been allowed to boil 30 minutes, that is to say, it has been considerably overboiled, as the proper boiling period would only be for ten minutes as above stated, the thermophoric mixture therein would gradually cool down to about 154° F. whereupon the sodium acetate present would begin to crystallize. However, unless the anhydrous sodium sulphate were present the mixture would remain indefinitely in a liquid condition because the sodium acetate and crystalline sodium sulphate contain sufficient water of crystallization to allow them to remain in a state of supersaturation. The addition of the anhydrous sodium sulphate however creates a dirth or insufficiency of water in the total mixture and repeated experiments have shown that even on long overboiling the mixture starts to crystallize upon cooling to a temperature for which the mixture is designed. Obviously the anhydrous form of any salt whose crystalline form contains water will perform this function. Care must be taken however to use an anhydrous salt that will properly mix with the other ingredients of the mixture and therefore it is not immaterial what form of anhydrous salt is used. For example, rock salt is an anhydrous salt that does not carry water of crystallization in its crystalline form and therefore the introduction of a salt of this character into the mixture would have no effect. It is preferable to use the anhydrous form of one or other of the crystalline salts used in the mixture.

Although the invention has been disclosed in connection with the specific details of preferred embodiments thereof, it must be understood that such details are not intended to be limitative of the invention except in so far as set forth in the accompanying claims.

What is claimed is:

1. A thermophoric mixture including crystalline salts and an anhydrous salt of one of said crystalline salts.

2. A thermophoric mixture comprising sodium acetate, glycerine, crystalline sodium sulphate and anhydrous sodium sulphate.

3. A thermophoric mixture comprising by weight 92% sodium acetate, 3% glycerine, 3% crystalline sodium sulphate and 2% anhydrous sodium sulphate.

4. A thermophoric mixture including $Na_2SO_4(10H_2O)$ and $Na_2SO_4$.

In testimony whereof I affix my signature.

THOMAS P. BELL.